United States Patent [19]

Jarvis et al.

[11] Patent Number: 4,732,323
[45] Date of Patent: Mar. 22, 1988

[54] LOWER SPRAY ARM SYSTEM FOR DISHWASHER

[75] Inventors: Wilbur W. Jarvis, St. Joseph Township, Berrien County; John I. Smith, Coloma Township, Berrien County, both of Mich.

[73] Assignee: Whirlpool Corporation, Benton Harbor, Mich.

[21] Appl. No.: 901,045

[22] Filed: Aug. 27, 1986

[51] Int. Cl.⁴ .......................... B05B 5/06; F16J 15/16
[52] U.S. Cl. ..................... 239/259; 138/147; 277/177; 277/27; 285/98
[58] Field of Search ............... 239/259, 261, 260, 254, 239/251, 264; 277/27, 173, 177; 138/45, 147; 384/147; 285/98, 281, 110, 910

[56] References Cited

U.S. PATENT DOCUMENTS

| Re. 18296 | 12/1931 | Pierce | 285/98 |
|---|---|---|---|
| 2,090,406 | 8/1937 | Thompson | 239/260 X |
| 2,237,979 | 4/1941 | Blide | 239/259 X |
| 2,365,272 | 12/1944 | Hughes | 239/254 |
| 3,006,663 | 10/1961 | Bonne | 285/910 X |
| 3,288,156 | 11/1966 | Jordan et al. | 239/243 |
| 3,408,095 | 10/1968 | Moore | 285/110 |
| 3,599,872 | 8/1971 | Guth | 239/261 |
| 3,642,207 | 2/1972 | Krogman | 239/251 |
| 3,770,305 | 11/1973 | Camasso | 285/110 |
| 3,771,725 | 11/1973 | Jenkins et al. |  |
| 3,776,465 | 12/1973 | Baker | 239/251 |
| 3,841,342 | 10/1974 | Cushing et al. | 134/144 |
| 3,866,837 | 2/1975 | Jenkins | 239/261 |

Primary Examiner—Andres Kashnikow
Assistant Examiner—Kevin Patrick Weldon
Attorney, Agent, or Firm—Wood, Dalton, Phillips, Mason & Rowe

[57] ABSTRACT

According to the invention a seal is established between a rotary spray arm and a stationary pedestal support for the spray arm. Liquid from a pump, which forcibly delivers liquid to the spray arm is forced between cooperating parts of the spray arm and spray arm support in such a manner that a sealing split ring is urged both axially and radially relative to the rotational axis of the spray arm into sealing engagement with surfaces on both the spray arm and spray arm support.

15 Claims, 6 Drawing Figures

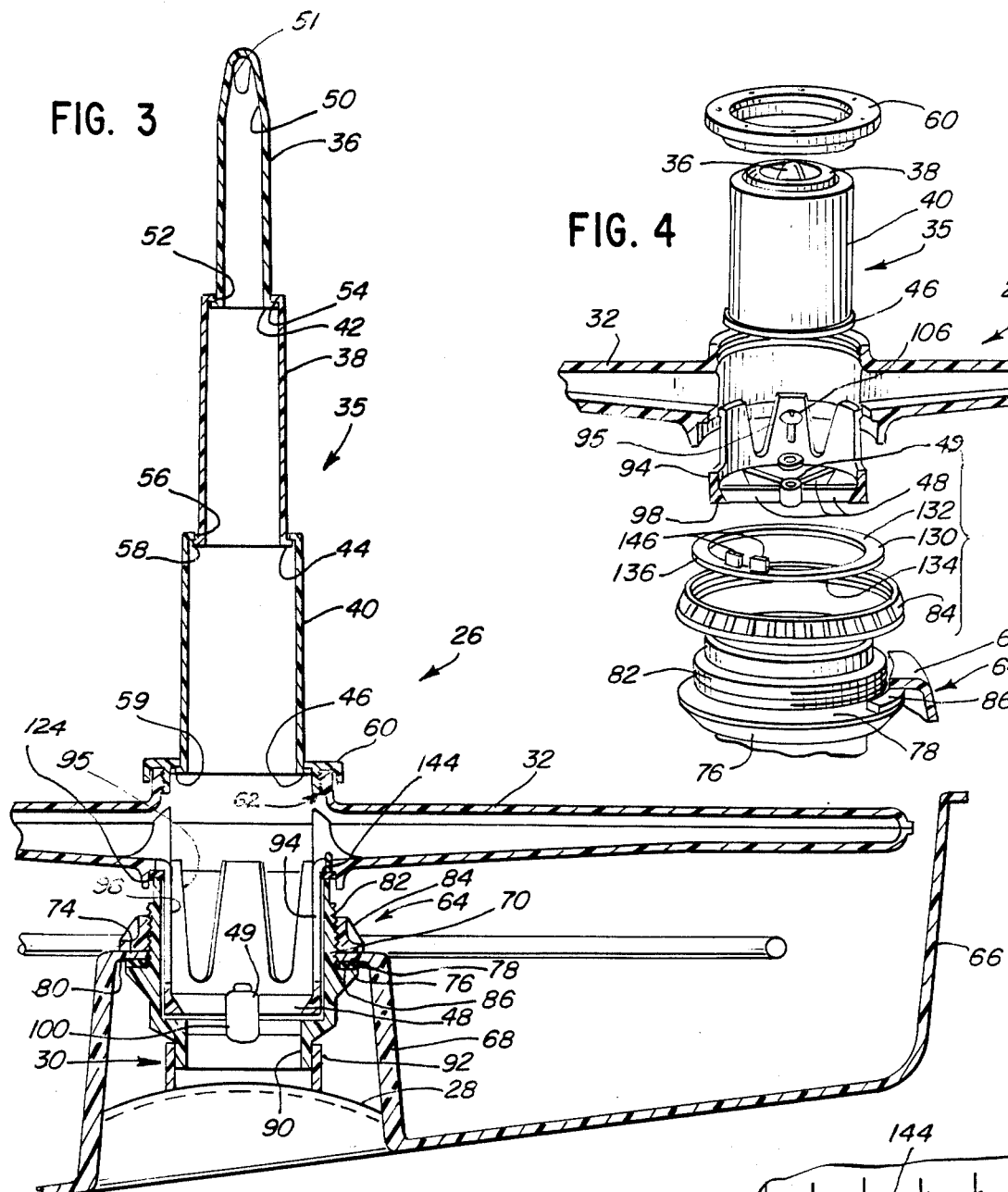
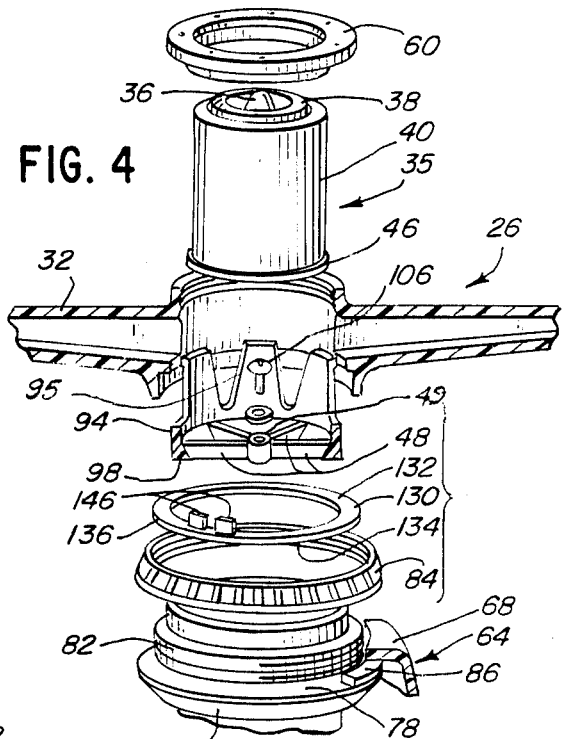
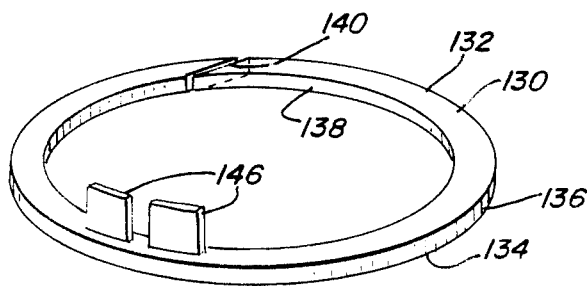
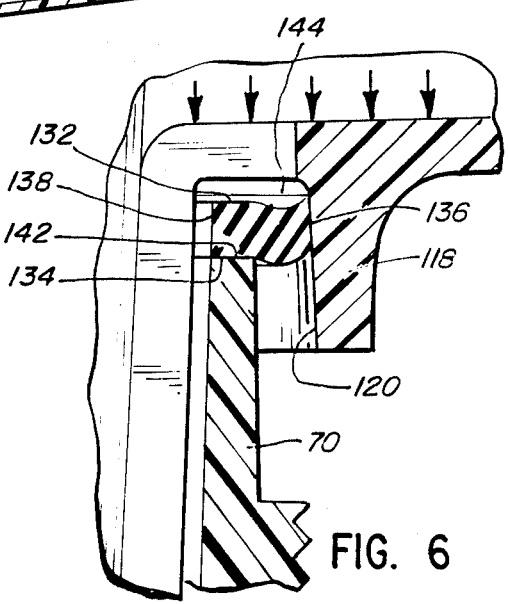

LOWER SPRAY ARM SYSTEM FOR DISHWASHER

BACKGROUND OF THE INVENTION

1. Field of the Invention

This invention relates to dishwashers and, in particular, to sealing structure between a rotary spray arm and a stationary pedestal supporting the spray arm.

2. Description of the Prior Art

Various structures have been used in the art to prevent leakage at the juncture between a rotary spray arm and a stationary pedestal for supporting the spray arm. While it is not absolutely critical that leakage be entirely prohibited, any leakage diminishes the pressure established in the spray arm, which delivers washing liquid to the wash chamber, and is therefore detrimental and should be minimized.

It is known to provide a gasket closely between cooperating spray arm and spray arm support structure to prevent the escape of the liquid therebetween. U.S. Pat. No. 3,642,207, to Krogman, discloses seal assemblies 100, 102 between rotating and stationary parts associated with a spray assembly. These seal assemblies are compressed between the rotating and stationary parts and thus are subject to substantial wear after prolonged use. When this occurs the seal is compromised. Additionally, the friction generated between the seal assemblies, rotating and stationary parts inhibits free rotation of the spray arm. Still further, the assembly of the seal assemblies in the Krogman structure is a relatively complicated process.

In U.S. Pat. No. 3,599,872, to Guth, a sealing tape is disclosed which fits relatively loosely in an annular space between cooperating parts on a rotary spray arm and a stationary support therefor. The ends of the tape overlap each other to define a ring, the diameter of which can be enlarged under the pressure of liquid delivered through a pump. As the pump operates the tape is progressively deformed radially outwardly from top to bottom to seal an opening between two vertically spaced, radially inwardly facing, sealing surfaces on the spray arm and stationary support. A substantial amount of pressure is required to effect deformation of the seal sufficiently to establish a seal with good integrity. Further, as the seal is conforming to the sealing surfaces, a substantial amount of leakage occurs.

SUMMARY OF THE INVENTION

The present invention is specifically directed to overcoming the above enumerated problems in a novel and simple manner.

According to the invention a seal is established between a rotary spray arm and a stationary pedestal support for the spray arm. Liquid from a pump, which forcibly delivers liquid to the spray arm is forced between cooperating parts of the spray arm and spray arm support in such a manner that a sealing split ring is urged both axially and radially relative to the rotational axis of the spray arm into sealing engagement with surfaces on both the spray arm and spray arm support.

The principal objective of the present invention is to establish a seal between a spray arm and stationary support therefor to prevent passage of washing liquid from the pump means between the spray arm and spray arm support into the wash chamber. At the same time the invention accounts for simplified assembly of the spray arm, spray arm support structure and sealing ring.

To assemble the spray arm the sealing ring need only be placed in an annular chamber associated with the spray arm after which the spray arm can be placed over and secured to the stationary spray arm support structure. Because the sealing ring is movable in the chamber within which it resides, it need not be precisely located during assembly as most conventional structures require. The invention facilitates placement of the sealing member and removal thereof for replacement.

The spray arm is preferably supported independently of the sealing ring. Because the ring does not support the spray arm during operation, the anticipated life of the sealing ring is lengthened.

Additionally, the sealing ring floats in a chamber associated with the spray arm. Consequently the ring will not bind between the rotary spray arm and stationary support between which is interacts.

BRIEF DESCRIPTION OF THE DRAWINGS

Other features and advantages of the invention will be apparent from the following description taken in conjunction with the accompanying drawings wherein:

FIG. 3 is a view similar to that in FIG. 2 with the tower in its fully extended state;

FIG. 4 is an exploded perspective view of the liquid delivery system according to the present invention;

FIG. 5 is an enlarged perspective view of a sealing ring interposed between a rotary spray arm of the liquid delivery system and a stationary support for the spray arm; and FIG. 6 is an enlarged, fragmentary sectional view of the ring in FIG. 5 in its sealed position between the spray arm and stationary support therefor.

DESCRIPTION OF THE PREFERRED EMBODIMENT

Figure 1:
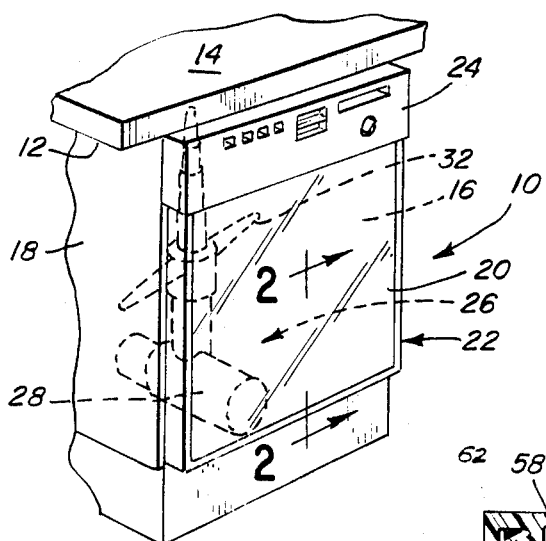
FIG. 1 is a perspective view of a dishwasher with a liquid delivery system for a washing chamber embodying the invention.

The liquid delivery system according to the present invention is intended for incorporation into a conventional style dishwasher, as shown generally at 10 in FIG. 1. The dishwasher in FIG. 1 is an under-the-counter design and is of a height to fit closely beneath the underside 12 of a counter surface 14. The dishwasher has an internal washing chamber 16, which is accessed through an opening at the front of the dishwasher cabinet 18. The front opening in the cabinet is closed sealingly by a door 20 that is selectively pivoted between its closed position, depicted in FIG. 1, and an open position wherein the door is pivoted forwardly about hinges on its lower edge portion 22. A control console 24 houses the electrical operating mechanism for the dishwasher. The basic electrical mechanism and the controls therefor do not constitute a part of the present invention, and thus a detailed description of the same is not in order.

The present invention is concerned with structure for delivering washing liquid from a source of supply into the washing chamber 16 and is shown generally at 26 in each of FIGS. 1-4. The structure 26 comprises a centrifugal pump 28 for forcibly delivering a washing liquid from a supply through a conduit at 30 into a rotary spray arm 32. The arm 32 has a plurality of discharge openings 34 through which liquid is forced into the washing chamber 16 and over utensils and dishes supported conventionally in slidable racks (not shown).

Figure 2:
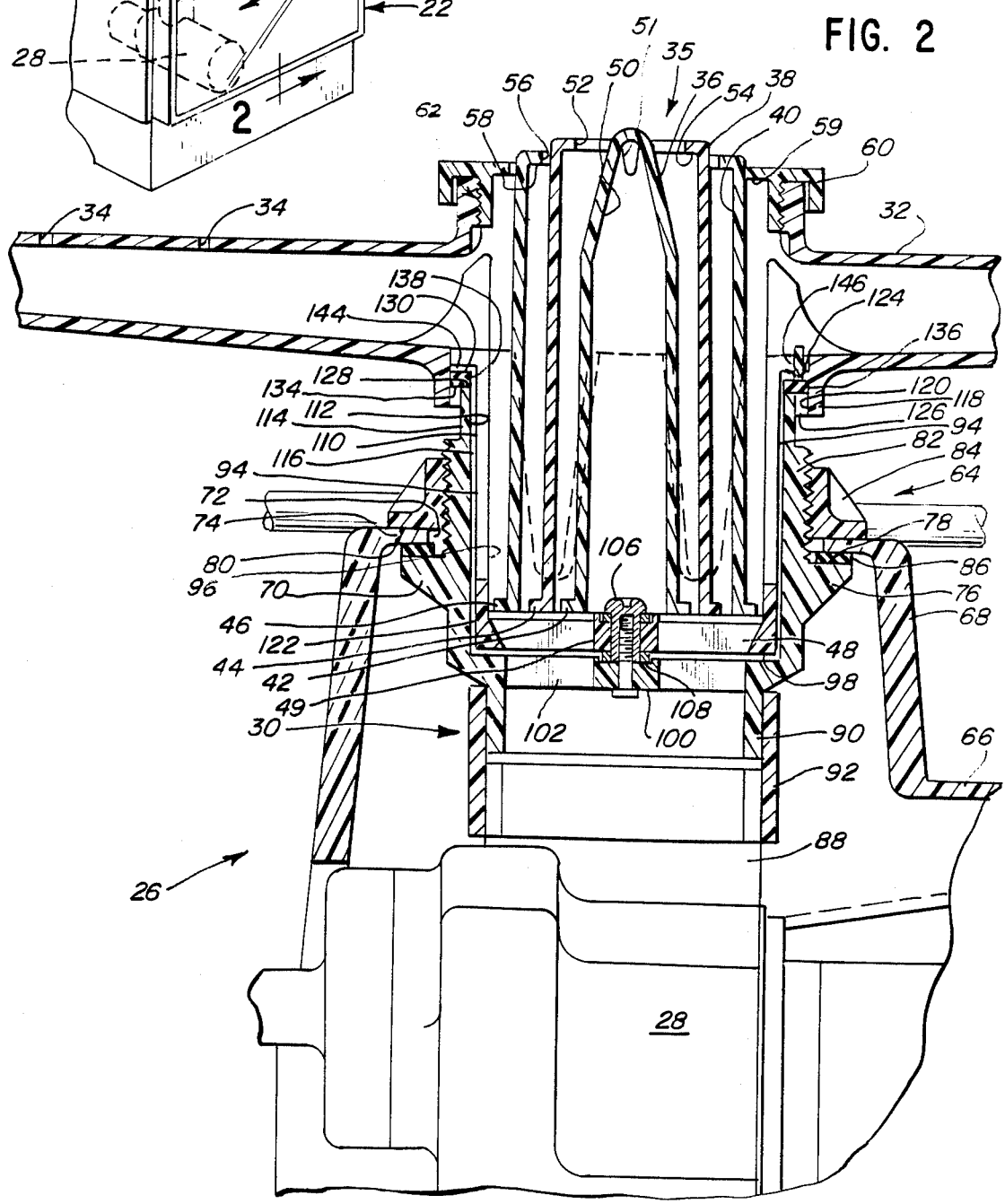
FIG. 2 is a sectional view of the liquid delivery system with a telescoping water delivery tower in a collapsed state.

The liquid delivering structure 26 has an associated collapsible tower at 35 which is movable under the force of liquid from the pump 28 from its collapsed state in FIG. 2 to a fully extended state shown in FIG. 3. The tower comprises three telescoping sections 36, 38, 40. The tower sections 36, 38, 40 are of substantially equal height and each has at its bottom portion a radially outwardly projecting annular flange of increasingly greater diameter from the inside tower section 36 to the outer section 40. In the collapsed position of FIG. 2 the flanges 42, 44, 46 seat against a series of ribs 48 projecting radially from a hub 49 at the bottom of the spray arm 32.

As liquid is delivered by the pump 28 through the conduit 30, it impinges on the tapered inside surface 50 of the tower section 36 which is thereby moved vertically upwardly guidingly through an opening 52 on tower section 38. The opening 52 is of a lesser diameter than the section 38 so that a downwardly facing shoulder 54 is defined which intercepts the upwardly moving flange 42 on the tower section 36. Further upward movement of the tower section 36 draws the tower section 38 through an opening 56 in the tower section 40 until the flange 44 encounters a downwardly facing shoulder 58 defined about the opening 56. The flange 44 draws tower section 40 with it upwardly until the flange 46 on the section 40 encounters the underside 59 of a retainer cap 60 secured fixedly to the spray arm 32 by interacting threads shown at 62. The tower in its extended position feeds liquid to the wash chamber through opening 51.

The present invention is specifically concerned with the maintenance of a seal between the rotary spray arm 32 and stationary support structure at 64 for the spray arm. The stationary support structure 64 is associated with the bottom of a tub 66, which defines the washing chamber 16. The tub has an integrally formed, raised support pedestal 68 over the region where the pump 28 is located. A cylindrical sleeve 70 extends through an opening 72 in the upper wall 74 of the pedestal 68. An enlarged portion 76 of the sleeve 70 defines an upwardly facing annular shoulder 78 which, with the sleeve directed through the pedestal opening 72, abuts the underside 80 of the pedestal wall 74. The sleeve portion 82 projecting immediately above the pedestal wall 74 is threaded to accept a retaining nut 84. A resilient gasket 86 is interposed between the shoulder 78 and the underside of the pedestal wall 74 and is captively maintained with the pedestal wall 74 between the nut 84 and enlarged sleeve portion 76. As the nut 84 is screwed downwardly, the gasket 86 compresses and establishes a leak-proof seal between the sleeve 70 and pedestal 68.

The pump 28 has an outlet 88 which communicates liquid through the bottom portion 90 of the sleeve 70. A connector 92 surrounds the bottom sleeve portion 90 and pump outlet 88 and establishes a fluid tight flow path between the pump and sleeve. The water delivered to the wash chamber by the pump 28 accumulates in a recirculating sump (not shown) which feeds back to the pump for redistribution in the wash chamber.

The spray arm 32 is mounted to the cylindrical sleeve 70 for rotation relative thereto. The spray arm 32 has an integrally formed, depending annular skirt 94. The inside skirt surface 96 bounds a space for the telescoping tower sections 36, 38, 40. Skirt 94 is borne at its bottom edge 98 by a hub 100 which is carried in the sleeve by a plurality of radially directed ribs 102. The hubs 49, 100 are interconnected through a shoulder screw 106. A spacer 108 maintains a slight vertical spacing between the hubs 49, 100 and permits free rotation of the spray arm 32 relative to the stationary support structure 64.

The skirt 94 of the spray arm 32 is coaxially aligned and in axially overlapping relationship with the sleeve 70. The annular outer surface 110 of the skirt 94 is of slightly smaller diameter than the inside surface 112 of the annular upper portion 114 of the sleeve 70 so that an annular passageway 116 is established between the skirt 94 and the sleeve 70. A plurality of openings 95 (six shown) are formed in the annular skirt 94 to prevent particles from becoming trapped in passageway 116. As the pump 28 operates, fluid passes through skirt 94 on its way to the spray arm 32. If a seal is not provided between the stationary portion 114 and the spray arm, fluid would discharge into the washing chamber and therefore diminish the pressure of the liquid delivered to the spray arm 32.

According to the invention a depending annular flange 118 is formed on the spray arm 32 radially outwardly of the annular skirt 94. The flange 118 has a radially inwardly facing annular surface 120 which, in conjunction with the outer annular surface 122 of the skirt and a downwardly facing surface 124 on the spray arm 32, defines a U-shaped chamber 126 opening downwardly towards the upwardly facing edge 128 of the sleeve 70. The chamber 126 is in fluid communication with the annular upper portion 114.

A sealing, plastic split ring 130, detailed in FIGS. 5 and 6, is situated in the chamber 126 and has axially oppositely facing flat surfaces 132, 134, peripheral annular outer edge 136 and a radially inwardly facing annular edge 138. A cut 140 in the ring 130 permits slight radial expansion thereof.

Assembly of the split ring 130 can be simply accomplished by placing it within the chamber 126 prior to assembly of the spray arm 32 with the support structure 64. The edges 136, 138 are dimensioned so that the ring is loosely fit against the surface 120 of the flange 118 and spaced a short distance from surface 120 of the skirt 94. The ring 130 is free to float both radially and axially within the chamber 126. Because of this loose relationship, the ring does not have to be fit in a precise location in the chamber as the spray arm 32 is assembled. With the spray arm assembled the ring 130 is confined between the axially downwardly facing surface 124 of the spray arm and the upwardly facing edge 128 of the sleeve 70.

Upon operation of the pump, liquid flowing from the pump to the spray arm is diverted into the chamber 124. The liquid entering the chamber 124 encounters the ring edge 138 and tends to urge the ring radially outwardly. The entering liquid is diverted radially outwardly by the surface 124 on the spray arm and tends to move the ring 130 axially downwardly until the surface 134 facially and sealingly abuts the upwardly facing surface 142 at the sleeve edge 128. At the same time the edge 136 of the ring 130 sealingly engages the surface 120 on the flange 118. Escape of fluid from the passageway into the wash chamber is substantially arrested by the sealing ring 130.

With the ring in sealed relationship with the sleeve 70 and flange 118, a pocket 144 is created and liquid pressure builds therein until the liquid reaches the pumping pressure and becomes substantially static. The pressurized liquid in the chamber exerts a downward force on the surface 130 and a radially outward force on the ring edge 138 tending to maintain the seal between the surface 134 of the ring and the sleeve surface 142 and the flange 120 and the ring edge 136. FIG. 6 clearly demonstrates the sealed position of the ring 130. It can be seen that the liquid pressure in chamber 126 urges the radially outer portion of the ring adjacent edge 136 downwardly between the sleeve and the surface 120 on the flange 118. The amount of deformation depends upon the material used to construct the ring and the deformation of the ring shown in FIG. 6 may be somewhat exaggerated. Preferably, a hard plastic is used to limit the amount of wear on the ring. Little or no axial deformation of the ring then results.

It may be desirable to key the ring to the spray arm 32 to follow movement thereof. Keying the ring to the spray helps reduce vibration noise created when the spray arm moves relative to the split ring. One exemplary structure for accomplishing this is shown in FIGS. 2 and 5 and comprises tabs 146 upstanding from the spray arm 32 and directed into one of the openings 95 in the spray arm annular skirt 94.

It can be seen that the ring 130 can be simply assembled and that liquid finding its way between the spray arm and stationary support structure urges the ring to its sealed position. Because the spray arm 32 does not bear on the ring 130, the ring has a substantial life.

The foregoing disclosure of specific embodiments is intended to be illustrative of the broad concepts comprehended by the invention.

We claim:

1. Structure for delivering washing liquid into a wash chamber of a dishwasher, said structure comprising:
    a spray arm support;
    a spray arm rotatively mounted to said spray arm support for rotation about an axis and having at least one liquid discharge opening and a radially inwardly facing annular surface,
    said spray arm support having a first, annular sealing surface facing axially with respect to said axis and a radially outwardly facing annular surface;
    said radially inwardly facing spray arm surface and said radially outwardly facing spray arm support surface cooperatively defining an annular opening located radially outwardly of said first annular sealing surface and in communication with the wash chamber;
    annular sealing means for selectively blocking the annular opening and having axially oppositely facing surfaces, a radially outwardly facing annular sealing surface and a radially inwardly facing surface;
    means mounting said sealing means for limited coaxial movement relative to said spray arm support;
    pump means for forcibly delivering a washing liquid from a source of washing liquid supply to said spray arm for delivery of washing liquid into said wash chamber through said discharge opening; and
    means for directing a portion of the washing liquid being delivered by said pump means simultaneously against said radially inwardly facing surface on the sealing means and one of the axially oppositely facing surfaces on the sealing means to thereby simultaneously urge the other of the axially oppositely facing surfaces on the sealing means axially sealingly against the first annular sealing surface on the spray arm support and the radially outwardly facing annular surface on the sealing means sealingly against the radially inwardly facing surface on the spray arm so that the sealing means blocks the annular opening to thereby prevent leakage of the washing liquid through said annular opening between said spray arm and said spray arm support into the wash chamber.

2. The liquid delivery structure according to claim 1 wherein the spray arm support has an annular portion with a free annular edge defining the first sealing surface, the spray arm has an annular portion which, with the spray arm assembled, is in axially overlapping relationship with the annular portion of the spray arm support and said means for directing the washing liquid comprises wall means forming openings in the annular portion of the spray arm.

3. The liquid delivering structure according to claim 1 wherein the spray arm has an axially facing surface, the first sealing surface on the spray arm support faces axially towards said axially facing spray arm surface and said sealing member is movable axially between the axially facing spray arm surface and the first sealing surface.

4. The liquid delivering structure according to claim 1 wherein the sealing means comprises a deformable split ring.

5. The liquid delivering structure according to claim 4 wherein said means for directing the liquid comprises a wall means forming parabolic openings in an annular skirt depending from said spray arm.

6. Structure for delivering a washing liquid into a wash chamber of a dishwasher, said structure comprising:
    a spray arm support having a first sealing surface residing substantially within a plane;
    a spray arm mounted to the spray arm support for rotation about an axis, said spray arm having a second sealing surface extending transversely to said plane and at least one liquid discharge opening,
    there being an opening between the first and second sealing surfaces in communication with the wash chamber;
    pump means for forcibly delivering a washing liquid from a source of washing liquid supply to said spray arm for delivery of washing liquid into said wash chamber through said discharge opening,
    a deformable sealing member having first and second oppositely facing flat surfaces and third and fourth surfaces each extending transversely to the oppositely facing flat surfaces;
    means mounting the sealing member movably relative to the spray arm support; and
    means for directing a portion of the washing liquid delivered by the pump means simultaneously against the first sealing member surface and the third sealing member surface to thereby sealingly urge the second sealing member surface in one direction against the first spray arm support sealing surface and across the opening between the first and second sealing surfaces to block the opening between the first and second sealing surfaces and the fourth sealing member surface transverse to said one direction sealingly against the second spray arm sealing surface to thereby prevent leakage of the washing liquid through said opening between the first and second sealing surfaces into the wash chamber.

7. The liquid delivering structure according to claim 6 wherein the second sealing surface faces radially inwardly with respect to the rotational axis of the spray arm and liquid delivered by the pump means causes the sealing member to deform and the fourth sealing member surface to be urged radially outwardly against the second spray arm sealing surface.

8. The liquid delivering structure according to claim 6 wherein the spray arm rotates about a substantially vertical axis, the first spray arm support sealing surface faces vertically upwardly and the second sealing member surface is urged by liquid from the pump means downwardly against the first spray arm support sealing surface.

9. The liquid delivering structure according to claim 6 wherein said sealing member comprises a deformable split ring with said first and second sealing member surfaces facing axially oppositely and said fourth sealing member surface comprises a peripheral radially outwardly facing edge surface.

10. Structure for delivering a washing liquid into a wash chamber of a dishwasher, said structure comprising:

a spray arm support in said wash chamber and having a vertically extending annular sleeve with an inside annular surface and an upwardly facing, annular sealing surface;

a spray arm having at least one liquid discharge opening and a depending annular skirt with an annular outer surface;

means mounting the spray arm so that the annular sleeve and the skirt are in axially overlapping relationship;

an annular flange on the spray arm and having a radially inwardly facing annular surface;

there being a downwardly facing surface on the spray arm which in conjunction with the inwardly facing surface of the flange and at least a portion of the outer surface of the spray arm skirt defines a U-shaped chamber opening downwardly towards said sealing surface on the spray arm support and being in communication with the liquid passageway;

a sealing member mounted in the U-shaped chamber and movable axially between the downwardly facing surface on the spray arm and the sealing surface on the spray arm support; and pump means for forcibly delivering a washing liquid from a source of washing liquid supply to said spray arm for delivery of washing liquid into said wash chamber through said discharge opening, said washing liquid delivered from the pump means delivered through said passageway further passing into said U-shaped chamber and building up pressure therein so as to urge the sealing member downwardly against the sealing surface on the spray arm support.

11. The liquid delivering structure according to claim 10 wherein the sealing member comprises a split ring which surrounds the annular sleeve on the spray arm support.

12. The liquid delivering structure according to claim 10 wherein said sealing member comprises a split ring having oppositely facing flat surfaces, a peripheral outer edge and an inside annular edge, said inside ring edge fitting around the annular sleeve so that a space is defined between the inside ring edge and the annular sleeve, said liquid from the pump means entering the chamber and causing a buildup of pressure on the inside ring edge and one of the oppositely facing flat ring surfaces so as to urge the other of the oppositely facing ring surfaces sealingly against the sealing surface on the spray arm support and the peripheral ring edge sealingly against the inwardly facing surface of the annular flange.

13. The liquid delivering structure according to claim 10 wherein means key the sealing member to the spray arm so that the sealing member follows rotation of the spray arm.

14. The liquid delivering structure according to claim 10 wherein said sealing member comprises a ring made from plastic.

15. The liquid delivering structure according to claim 10 wherein said spray arm support structure is integral with the pump means, said wash chamber is defined by a tub and the spray arm is supported by the spray arm support structure at a location beneath the tub.

* * * * *